United States Patent
Zhang (10) Patent No.: US 8,081,452 B2
(45) Date of Patent: Dec. 20, 2011

(54) COMPUTER CASE

(75) Inventor: Shuai Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 29 days.

(21) Appl. No.: 12/820,159

(22) Filed: Jun. 22, 2010

(65) Prior Publication Data
US 2011/0249396 A1 Oct. 13, 2011

(30) Foreign Application Priority Data

Apr. 9, 2010 (CN) .......................... 2010 1 0143531

(51) Int. Cl.
*H05K 5/00* (2006.01)
*H05K 7/00* (2006.01)
(52) U.S. Cl. ......... 361/679.58; 361/679.55; 361/679.56; 361/752
(58) Field of Classification Search ............. 361/679.55, 361/679.56, 679.58, 752
See application file for complete search history.

(56) References Cited

U.S. PATENT DOCUMENTS

| | | | | |
|---|---|---|---|---|
| 5,515,237 | A * | 5/1996 | Ogami et al. | 361/679.37 |
| 5,821,614 | A * | 10/1998 | Hashimoto et al. | 257/679 |
| 6,172,867 | B1 * | 1/2001 | Satou et al. | 361/679.06 |
| 7,355,845 | B2 * | 4/2008 | Kim et al. | 361/679.33 |
| 2008/0002348 | A1 * | 1/2008 | Kim et al. | 361/685 |

* cited by examiner

*Primary Examiner* — Anthony Haughton
(74) *Attorney, Agent, or Firm* — Zhigang Ma (57) ABSTRACT

A computer case includes a case, a main board, and a carrier. The case includes guiding members. The main board includes a first circuit board and a second circuit board. The first circuit board is attached to the case. The first circuit board includes a first connector. The second circuit board includes a second connector. The carrier includes a main body, a handle, and at least one latching member. The second circuit board is removably connected to the main body. Each latching member includes a rotary member and a rotary arm. The rotary member is rotatably connected to the main body and the rotary arm. The rotary member defines a receiving groove. The rotary arm is rotatably connected to the handle. When the second connector is connected to the first connector, guiding members stay in the receiving grooves to prevent the main body and the handle from moving.

9 Claims, 9 Drawing Sheets

COMPUTER CASE

BACKGROUND

1. Technical Field

The present disclosure relates to computer cases and, particularly, to a computer case including a plurality of printed circuit boards to replace one conventional motherboard.

2. Description of Related Art

A desktop computer case includes a front panel, a shell, a case and disk drive racks, etc. Because a main board is an integral part, a large amount of interior space within the case is provided for mounting the main board, which limits how slim the computer case can be designed.

BRIEF DESCRIPTION OF THE DRAWINGS

The components in the drawings are not necessarily drawn to scale, the emphasis instead placed upon clearly illustrating the principles of a computer case. Moreover, in the drawings, like reference numerals designate corresponding parts throughout the several views.

DETAILED DESCRIPTION

Figure 1:
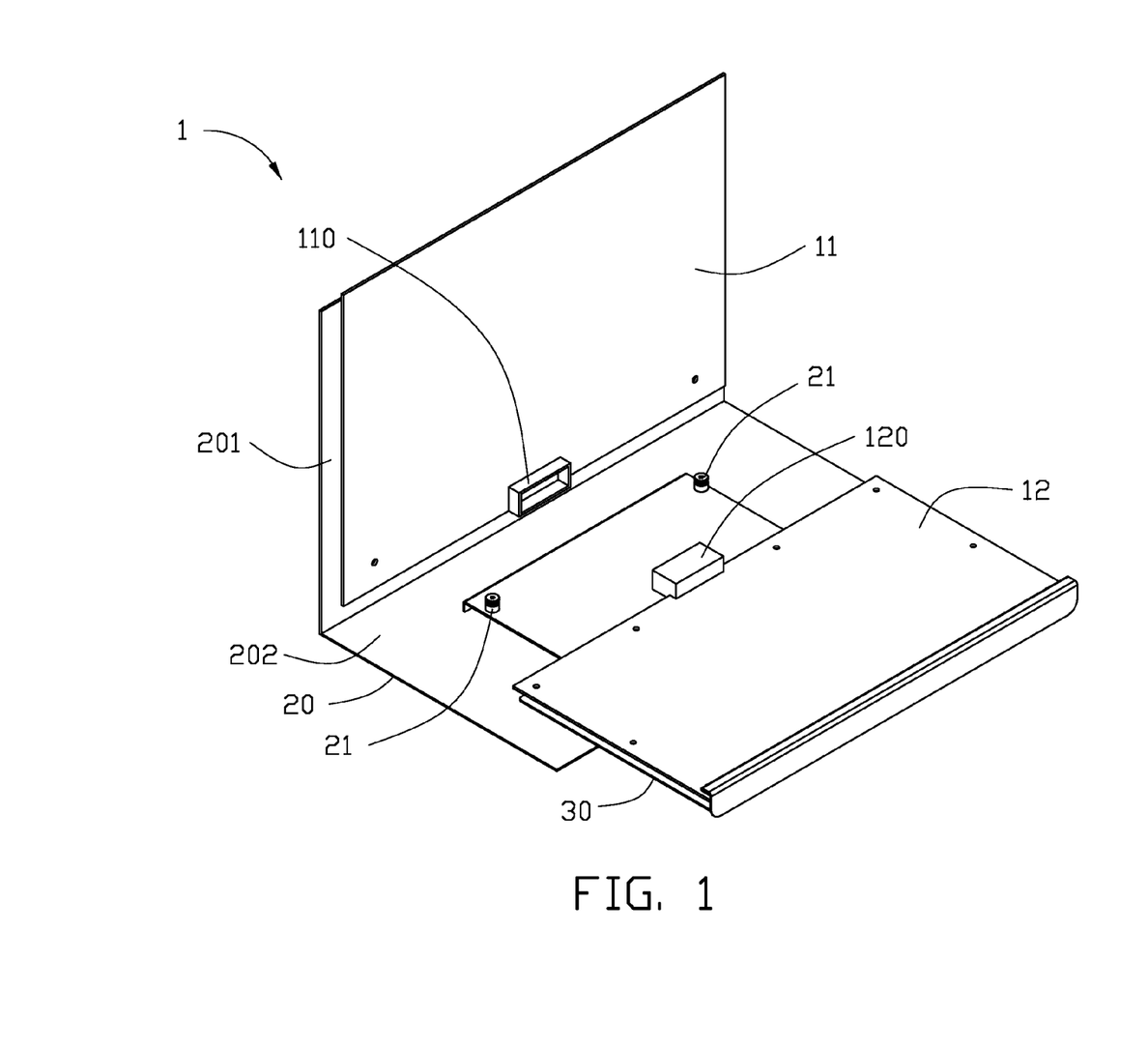
FIG. 1 is an isometric view of a computer case in accordance with an exemplary embodiment with certain elements omitted for clarity, showing a first circuit board and a second circuit board in a disconnected state.
Figure 2:
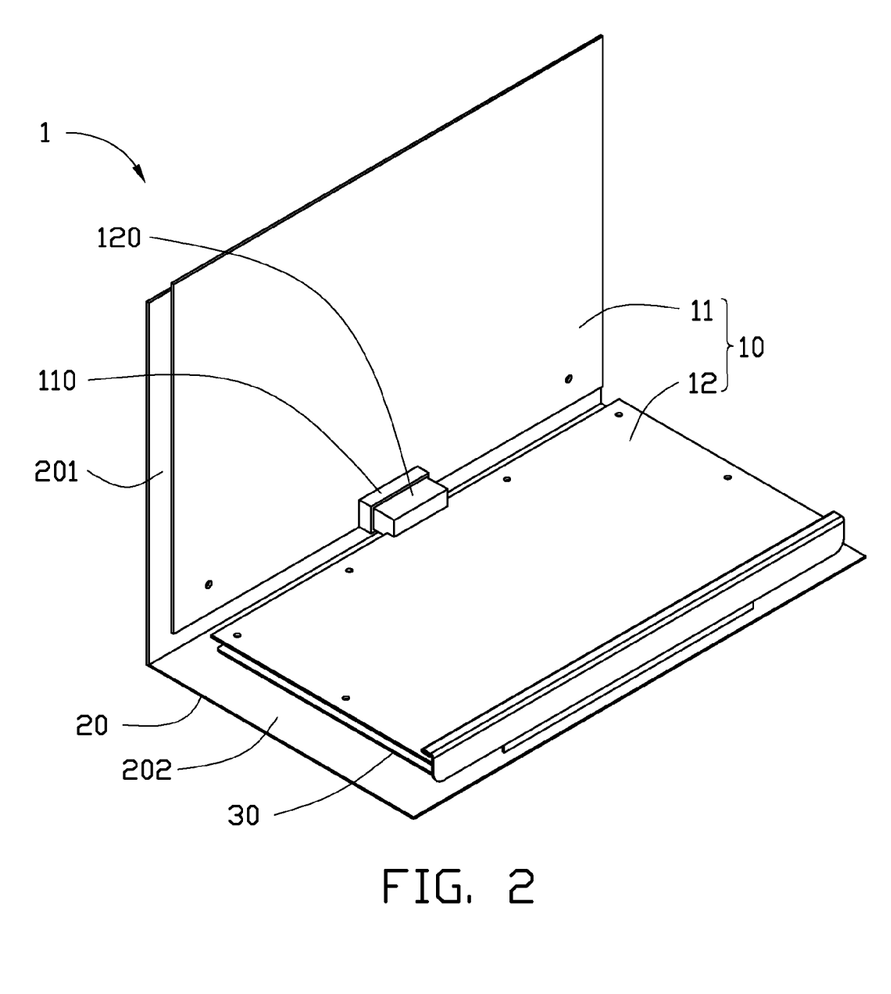
FIG. 2 is similar to FIG. 1, but showing the first circuit board and the second circuit board in a connected state.
Figure 3:
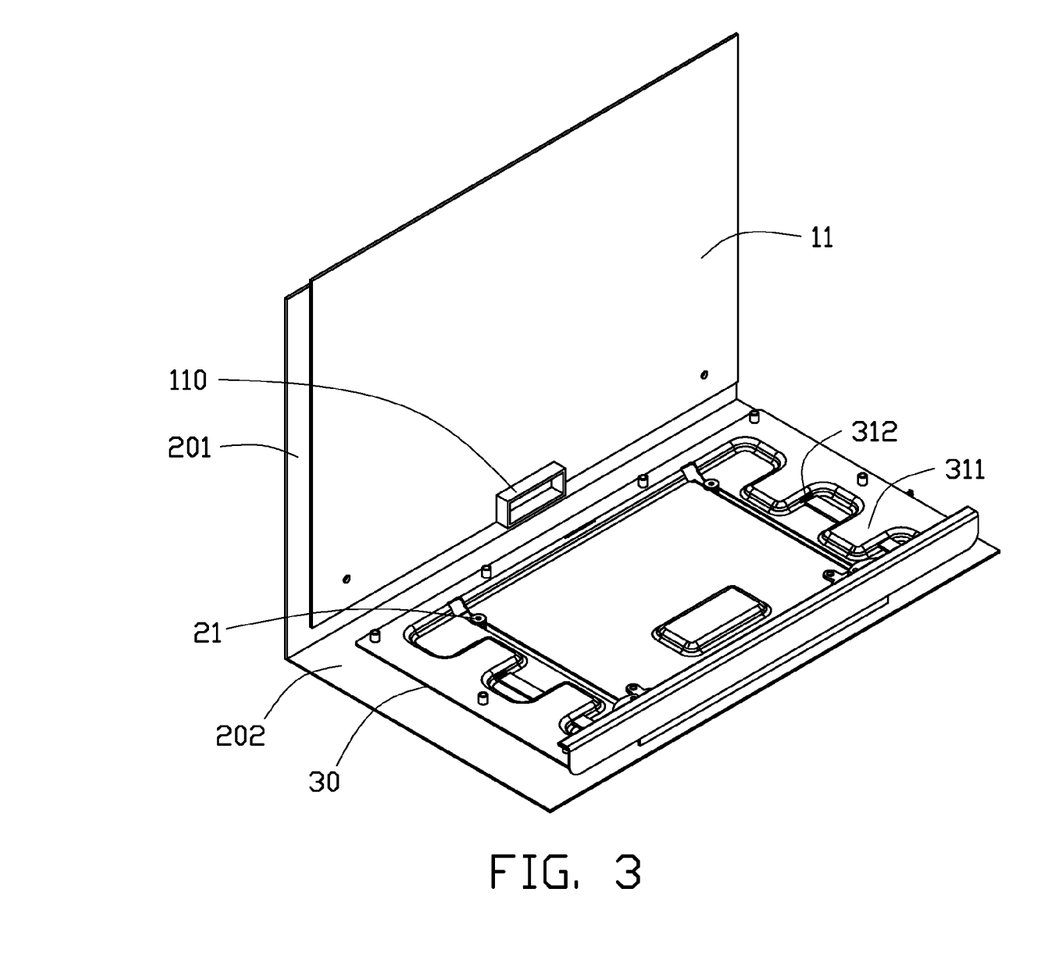
FIG. 3 is an isometric view of the computer case of FIG. 1 with the second circuit board omitted for clarity.
Figure 4:
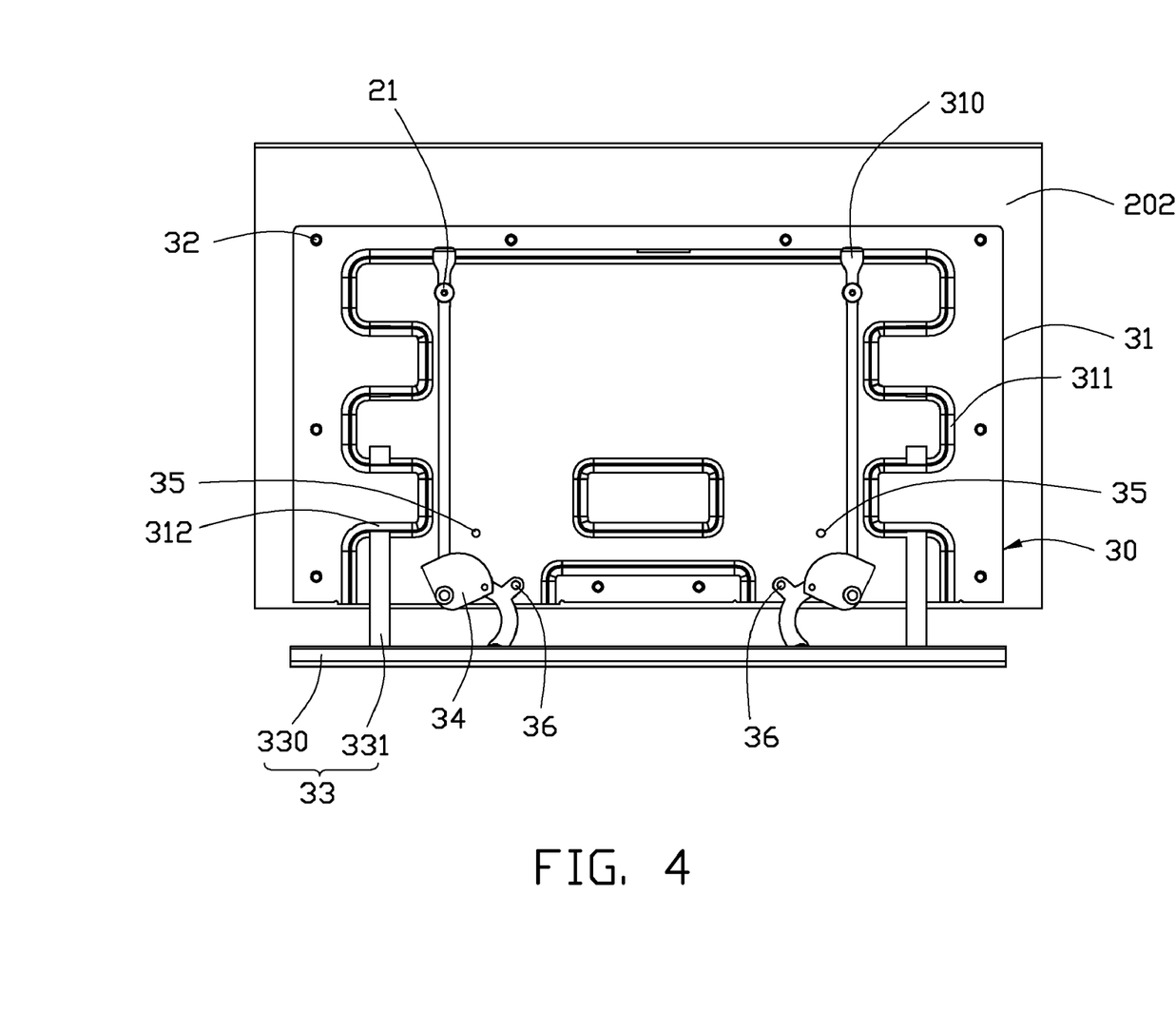
FIG. 4 is a planar internal view of a carrier of the computer case of FIG. 1.
Figure 5:
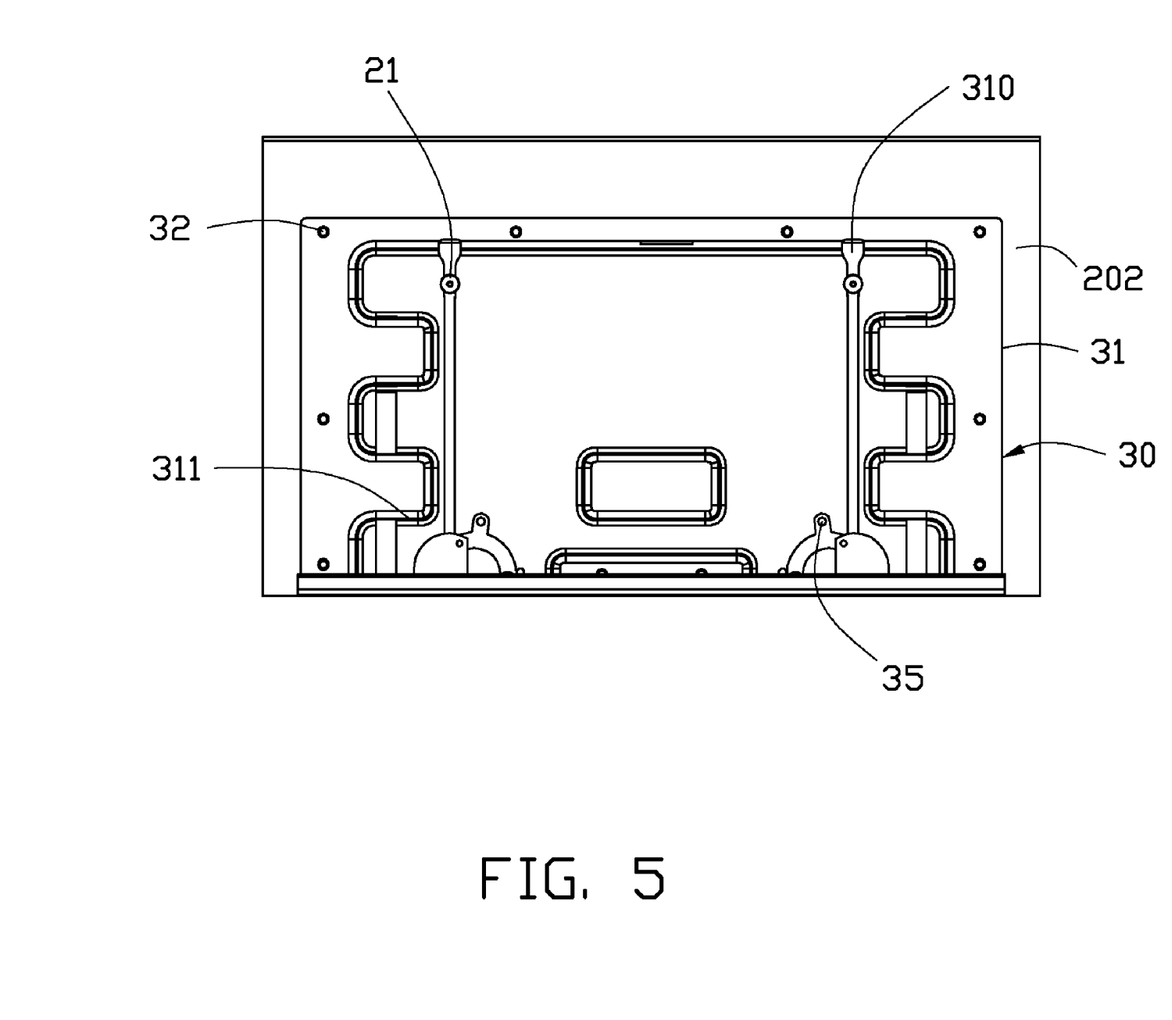
FIG. 5 is similar to FIG. 3 but showing the state of the carrier as it is in FIG. 2.
Figure 6:
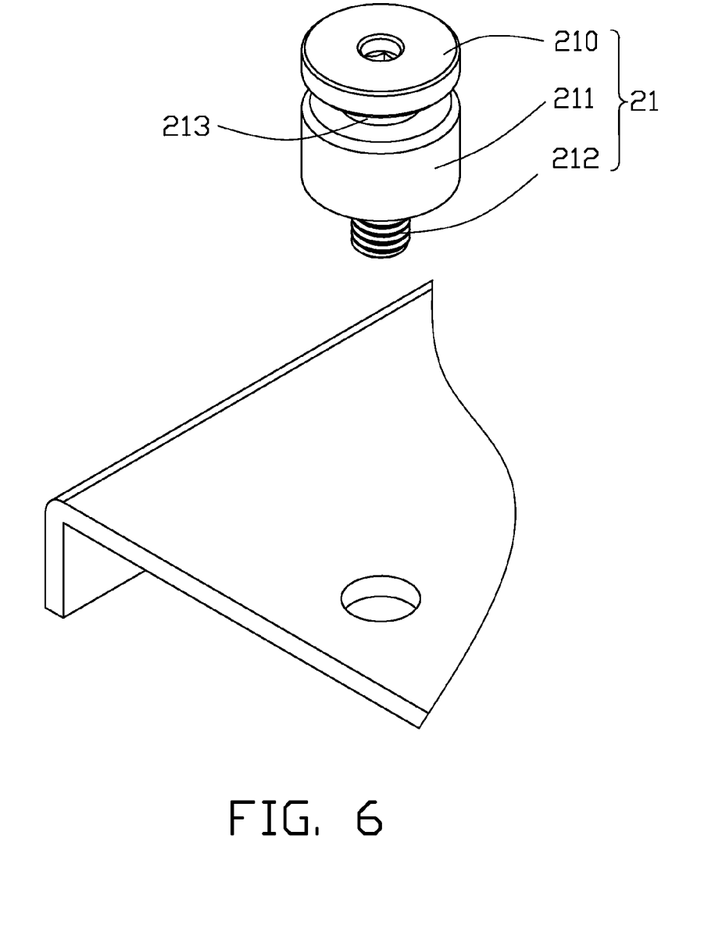
FIG. 6 is an isometric view of a guiding member of the computer case of FIG. 1.

Referring to FIGS. 1-2, a computer case 1 includes a main board 10, a case 20, and a carrier 30. The main board 10 includes a first circuit board 11 and a second circuit board 12. The case 20 includes a side plate 201, a bottom plate 202, and other plates (not shown) that are connected together to define a space to receive the main board 10 and other electronic components (not shown). The first circuit board 11 is connected to the inner surface of the side plate 201. The first circuit board 11 includes a first connector 110. The second circuit board 12 is movably connected to the bottom plate 202 through the carrier 30, and includes a second connector 120. When the first connector 110 and the second connector 120 are connected together, data can be transmitted between the first circuit board 11 and the second circuit board 12.

Referring to FIGS. 3-6, the case 20 includes at least two pairs of guiding members 21. The carrier 30 includes a main body 31 that defines at least two guiding slots 310 to receive the guiding members 21. In the embodiment, each guiding member 21 includes a head 210, a support 211, and a rod 212. The head 210 and the support 211 are spaced apart from each other to define a gap 213. The rod 212 is attached to the bottom plate 202, while the guiding member 21 extends through the slot 310 with the head 210 and the support 211 arranged on opposite sides of the main body 31. The main body 31 is received in the gap 213, which prevents the main body 31 from contacting the bottom plate 202, but allows the main body 31 to slide relative to the bottom plate 202. The main body 31 includes a plurality of walls 311 that protrude there from and are substantially parallel to the side plates 201. Each wall 311 defines a through hole 312.

The carrier 30 further includes a plurality of limiting posts 32, a handle 33, two latching members 34, two first positioning members 35, and two second positioning members 36. The limiting posts 32 are fixed around the periphery of the main body 31 to connect the second circuit board 12 to the main body 31. In the embodiment, the limiting posts 32 are fasteners such as screws.

The handle 33 includes a driving member 330 and at least two bars 331 protruding from the driving member 330. The bars 331 extend through the holes 312 and are slidable relative to the walls 311.

Figure 7:
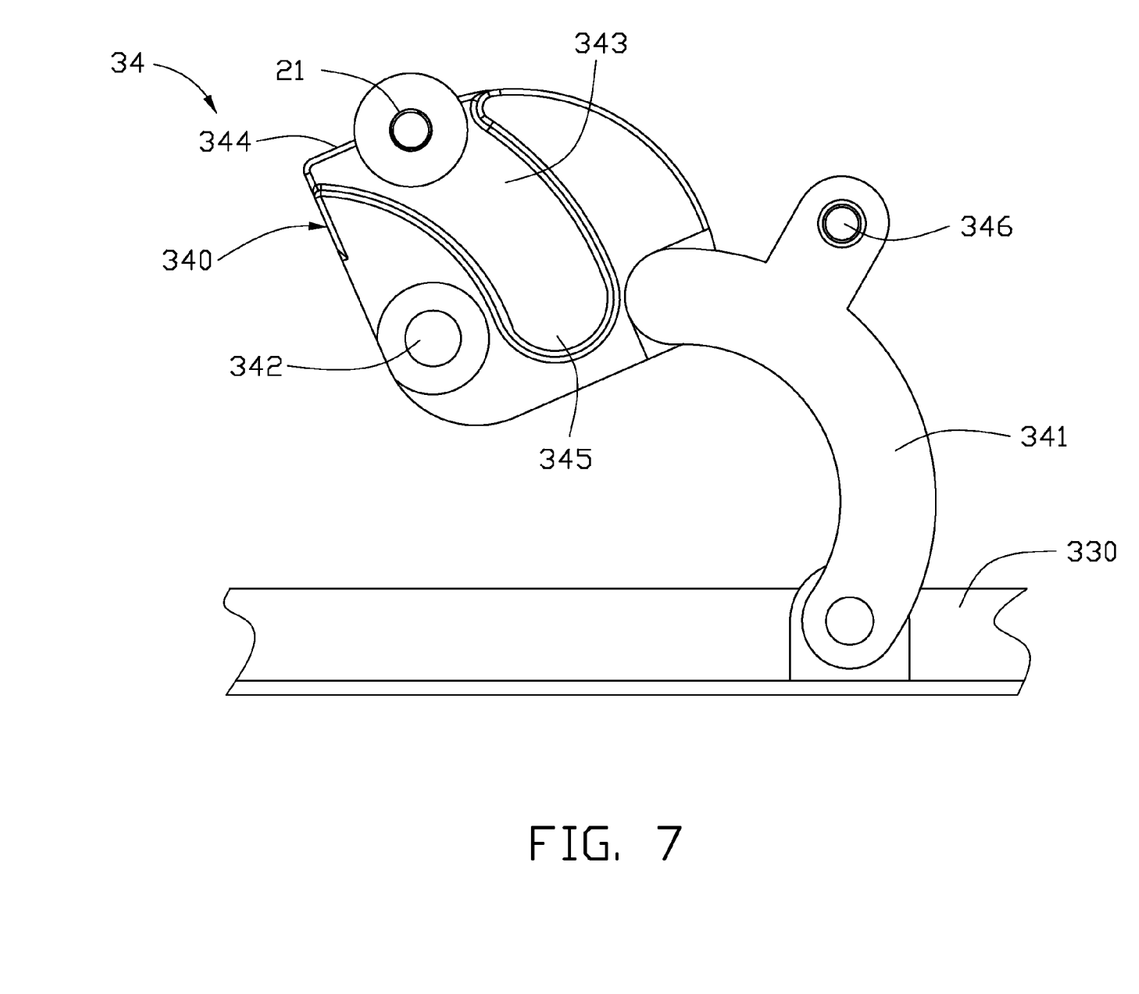
FIG. 7 is a partial planar view of the carrier of FIG. 4, showing a latching member of the carrier and the guiding member of the case.
Figure 8:
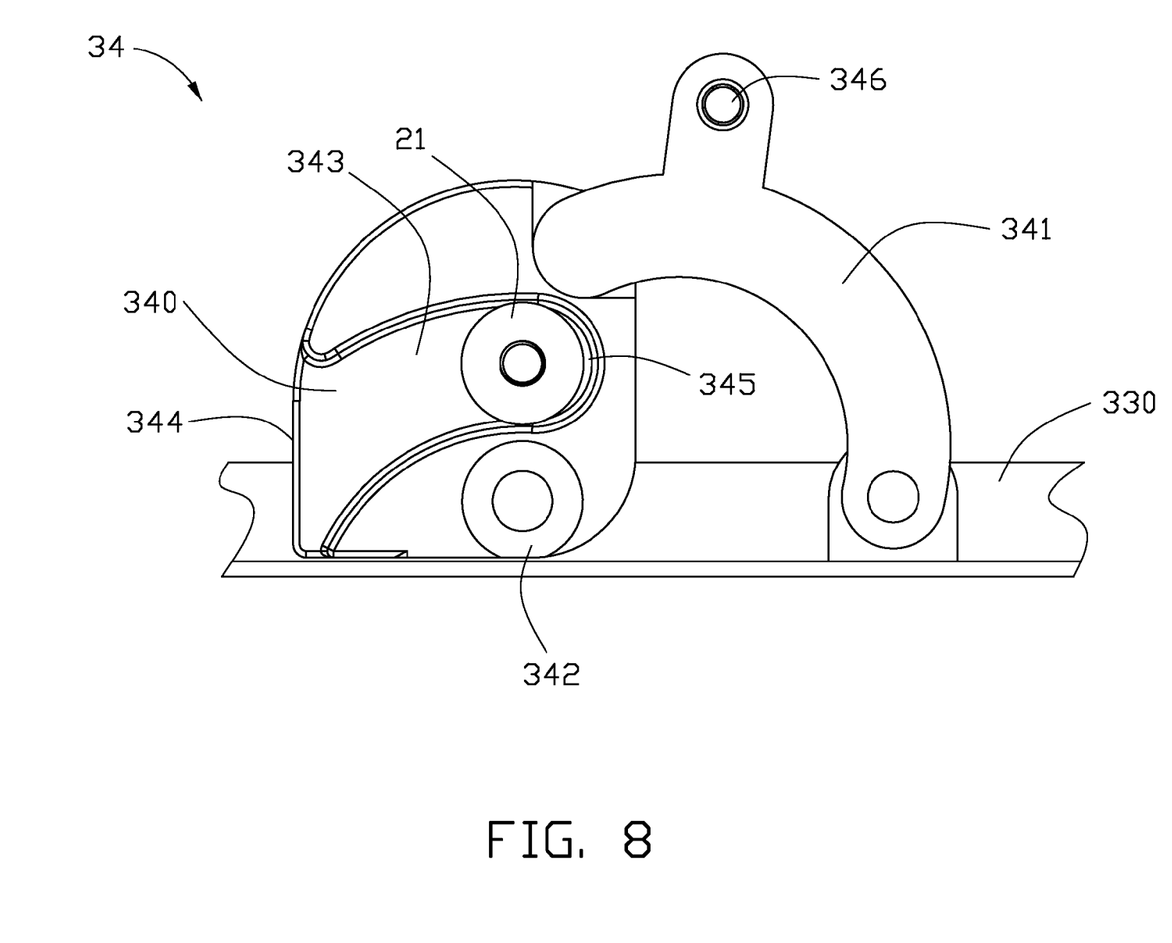
FIG. 8 is similar to FIG. 6, but showing the state of the latching member as it is in FIG. 5.
Figure 9:
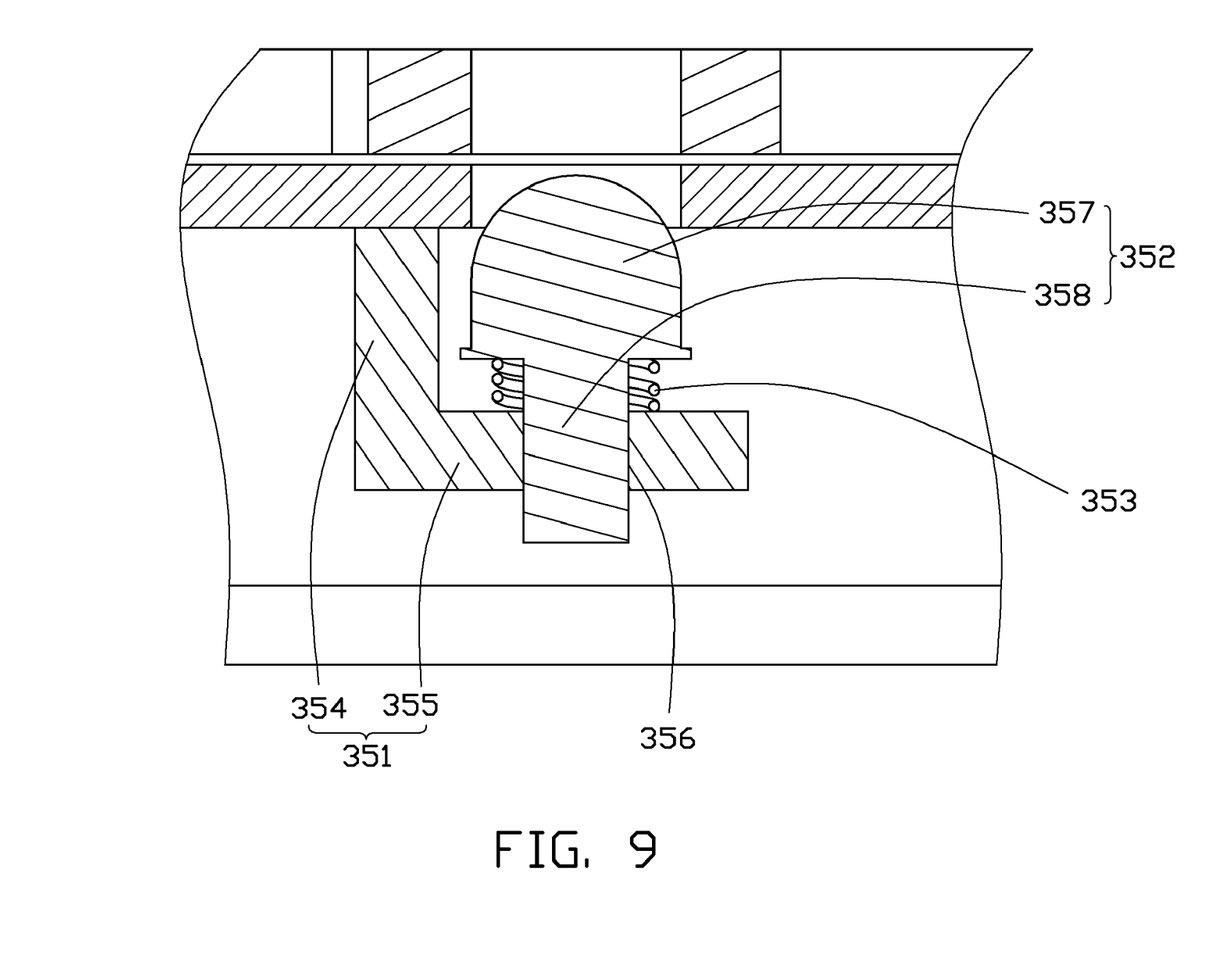
FIG. 9 is a partial, cross-sectional view of a positioning member of the computer case of FIG. 1.

Referring to FIGS. 7-9, each latching member 34 includes a rotary member 340 and a rotary arm 341. One end of the rotary member 340 is rotatably connected to the main body 31, and the other end is rotatably connected to the rotary arm 341. The rotary member 340 includes a joint 342, and a receiving groove 343. The rotary member 340 is rotatably connected to the main body 31 at the joint 342. In the embodiment, the receiving groove 343 is substantially arc-shaped and configured to receive the guiding member 21. The receiving groove 343 includes an open end 344 and a closed end 345. The width of the groove 343 tapers from the open end 344 towards the closed end 345. The distance between the open end 344 and the joint 342 is greater than that between the closed end 345 and the joint 342.

In the embodiment, the rotary arm 341 is arc-shaped. The rotary arm 341 defines a positioning hole 346 to receive the first positioning member 35 and the second positioning member 36.

Each first positioning member 35 and each second positioning member 36 can retract into the main body 31. In the embodiment, each first positioning member 35 and each second positioning member 36 are aligned and are the same in structure. Each first positioning member 35 includes a support 351, a pin 352, and an elastic member 353. The support 351 includes a first wall 354 and a second wall 355 substantially perpendicular to each other. The first wall 354 protrudes from the bottom of the main body 31. The second wall 355 defines a through hole 356. The pin 352 includes a head 357 and a rod 358. The rod 358 portion of the pin 352 extends through the through hole 356. The elastic member 353 is fixed between the head 357 and the second wall 355 to apply force between the head 357 and the second wall 355.

When the rotary arms 341 urge the heads 357 to move downward, the elastic members 353 are compressed. When the rotary arms 341 disengage from the heads 357, the elastic members 353 rebound to force the heads 357 to move back to its original position.

To connect the second connector 120 to the first connector 110, the driving member 330 is pushed to move toward the side plate 201. The arms 341 move together with the driving member 330, causing the rotary members 340 to rotate. After the arms 341 move to a position where the heads 357 is received in the positioning holes 346 of the arms 341, the movement of the arms 341 relative to the main body 31 is stopped. The carrier 30 can thus move as a whole.

After the main body 31 moves together with the handle 33 to a position where the guiding members 21 is in the open ends 344 of the receiving grooves 343. Further pushing of the handle 33 will cause the edge of the grooves 343 contacts the guiding members 21, stopping the moving of the rotary members 340, but applying torque to the rotary members 340. The rotary members 340 thus rotates and causes the arms 341 to disengage from the first positioning members 35. After the rotary members 340 rotates to a position where the guiding members 21 abuts against the closed ends 345, the second connector 120 is connected to the first connector 110. At the same time, the first positioning members 35 are received in the positioning holes 346 of the arms 341. The carrier 30 thus stays in a locked state.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely preferred or exemplary embodiments of the present disclosure.

What is claimed is:

1. A computer case comprising:
   a case comprising at least two pairs of guiding members;
   a main board comprising a first circuit board and a second circuit board, the first circuit board being fixed to the case and comprising a first connector, the second circuit board comprising a second connector; and
   a carrier comprising:
      a main body, to which the second circuit board being removably connected;
      a handle slidably connected to the main body; and
      at least one latching member comprising a rotary arm and a rotary member, the rotary arm being rotatably connected to the handle and the rotary member, the rotary member being rotatably connected to the main body and the rotary arm, the rotary member defining a receiving groove;
   wherein when the second connector is connected to the first connector, one of the at least two pairs of guiding members stays in the receiving groove, preventing the main body and the handle from moving.

2. The computer case as described in claim 1, wherein the main body comprises a plurality of guiding slots, the guiding members are received in the guiding slots to guide the carrier.

3. The computer case as described in claim 1, wherein the handle comprises a driving member and at least two bars substantially perpendicularly to the driving member, a plurality of walls protrude from the main body, the wall each defines at least one through hole to receive the bars to guide the moving of the handle.

4. The computer case as described in claim 1, wherein the carrier further comprises a plurality of limiting posts around the periphery of the main body, each limiting post is configured to fix the second circuit board to the carrier.

5. The computer case as described in claim 1, wherein the carrier comprises a first positioning member, the rotary arm comprises a positioning hole, the positioning hole is configured to receive the first positioning member, when the first positioning member is received in the positioning hole, the first connector contacts the second connector.

6. The computer case as described in claim 1, wherein the carrier comprises a second positioning member, the rotary arm comprises a positioning hole, the positioning hole is configured to receive the second positioning member, when the second positioning member is received in the positioning hole, the movement of the rotary arm relative to the main body is stopped and the carrier moves as a whole.

7. The computer case as described in claim 1, wherein the receiving groove comprises an open end, the guiding members adjacent the handle enter the receiving groove from the open end.

8. The computer case as described in claim 7, wherein the receiving groove comprises a closed end, the width of the open end is wider than that of the closed end.

9. The computer case as described in claim 8, wherein the rotary member comprises a joint, the distance between the joint and the open end is greater than that between the joint and the closed end.

* * * * *